US006079699A

United States Patent [19]

Gibbons

[11] Patent Number: 6,079,699

[45] Date of Patent: Jun. 27, 2000

[54] SPRING ASSEMBLIES FOR MATTRESSES AND THE LIKE

[75] Inventor: Frank Gibbons, Merseyside, United Kingdom

[73] Assignee: Slumberland PLC, Oldham, United Kingdom

[21] Appl. No.: 08/545,589

[22] PCT Filed: Mar. 10, 1995

[86] PCT No.: PCT/GB95/00529

§ 371 Date: Mar. 11, 1996

§ 102(e) Date: Mar. 11, 1996

[87] PCT Pub. No.: WO95/24847

PCT Pub. Date: Sep. 21, 1995

[30] Foreign Application Priority Data

Mar. 12, 1994 [GB] United Kingdom ................... 9404850

[51] Int. Cl.[7] ........................................................ F16F 3/00

[52] U.S. Cl. ................................ 267/80; 29/429; 53/114; 53/548

[58] Field of Search ............................... 29/428, 429, 91, 29/91.1, 451, 565, 714; 5/254, 716, 655.7, 655.8; 267/80, 153; 53/138.5, 526, 548, 553, 114, 438, 450

[56] References Cited

U.S. PATENT DOCUMENTS

| | | | |
|---|---|---|---|
| 2,983,236 | 5/1961 | Thompson | 53/114 |
| 3,668,816 | 6/1972 | Thompson | 53/114 X |
| 4,439,977 | 4/1984 | Stumpf | 53/114 X |
| 4,854,023 | 8/1989 | Stumpf | 29/91 |
| 5,134,763 | 8/1992 | Schulz, Jr. et al. | 29/91 |
| 5,553,443 | 9/1996 | St. Clair et al. | 53/450 |

FOREIGN PATENT DOCUMENTS

| | | | |
|---|---|---|---|
| WOA91 05732 | 5/1991 | WIPO | B68G 9/00 |

*Primary Examiner*—Robert J. Oberleitner
*Assistant Examiner*—Pamela J. Lipka
*Attorney, Agent, or Firm*—Christensen O'Connor Johnson & Kindness PLLC

[57] ABSTRACT

A spring assembly comprises upper and lower superimposed webs of strong yet flexible material which are connected together at spaced intervals to define a plurality of similar pockets (30, 31, 32, 33 . . . ) arranged side-by-side in a parallel relationship, and a length of continuous spring (20) inserted into each successive pre-formed pocket. Apparatus and a method of manufacturing the spring assembly are also disclosed.

3 Claims, 6 Drawing Sheets

SPRING ASSEMBLIES FOR MATTRESSES AND THE LIKE

This invention relates to spring assemblies for use in mattresses, spring upholstered furniture and the like, to apparatus for manufacturing such spring assemblies, and to a method of manufacturing such spring assemblies. The present invention also relates to a spring interior comprised of a plurality of such spring assemblies. The present invention further relates to an article of spring upholstered furniture comprised of one or more of such spring assemblies.

In our International Patent Application No. WO 90/01285 we have disclosed a spring unit for use in making spring interiors for articles of furniture comprising a continuous coil sheathed in an envelope of strong yet flexible material. The sheath may comprise a tube into which a spring is inserted through a sleeve. In another construction the free ends of a sheet of calico material and a length of spring are drawn down through a Vee-shaped former which serves to direct the continuous edges of the sheet up and around the spring and simultaneously draws the sides of the sheet together whereafter they are stitched together in this position. Sheathed coil springs so produced may then be cut into discrete lengths which can then be arranged side-by-side and connected together, for example by the use of hog rings, to form a spring assembly. In another construction, a spring assembly can be formed by folding back and forth several times a single length of sheathed coil spring to form a plurality of rows disposed side-by-side.

We are aware of French Patent No. 1 503 723 which discloses a mattress comprising a succession of rows of metal springs which are arranged side-by-side and parallel to each other. Each row is individually encased in a fabric sleeve which separates itself from its neighbours. Each of the different sleeves is formed of two pieces of cloth, one below and one above, and the two pieces of cloth are fastened to each other in straight parallel lines between each row of springs, and at a position half way up the height of the spring.

In our International Patent Application No. WO 91/05732 we have also disclosed apparatus for encapsulating spring units between a pair of webs, in which the apparatus comprises an insertion device for inserting a spring unit between a pair of webs, means for tightening or tensioning the webs about the spring unit, compression means for compressing the spring unit, and securing means for securing the webs together in close proximity to the compressed spring unit to encapsulate same. A series of such encapsulated spring units comprise a spring assembly.

According to one aspect of our present invention a spring assembly comprises upper and lower superimposed webs of strong yet flexible material which are connected together at spaced intervals to define a plurality of similar pockets arranged side-by-side in a parallel relationship, and a length of continuous coil spring inserted into each successive pre-formed pocket.

The spring assembly may be cut to any convenient length, and may be used on its own or superimposed upon one or more similar assemblies to form a spring interior for a mattress or for use in other articles of upholstered furniture.

According to another aspect of our invention apparatus for use in making spring assemblies comprises upper and lower continuous webs of strong yet flexible material drawn into a superimposed relationship at a securing station, securing means adapted to traverse the webs at the securing station, to secure them together at spaced parallel locations, in turn to form a succession of spaced parallel pockets which traverse the webs, and an insertion device for inserting a spring unit into each successive pocket at an insertion station downstream of the securing station.

Preferably means are provided for drawing the webs from respective upper and lower rolls and through the stations in an intermittent step wise movement in synchronism with the operation of at least the securing means at the securing station.

The insertion device may comprise an elongate channel or trough shaped member for inserting a spring unit into a pocket, in combination with upper and lower indexing rails which are relatively movable towards and away from each other to release an inserted spring unit from the member whereafter the member can be withdrawn from the pocket leaving the spring unit in position.

The elongate member preferably comprise a lance provided with a channel or trough in one of its faces in which internal side walls defining the channel or trough are formed with projections of saw-tooth outline to receive parts of the spring unit, flanks of the teeth diverging with respect to the direction of insertion the lance into a pocket, and crests of the teeth cooperating with the spring unit to ensure that the spring unit is carried into the pocket with the lance.

In a loading position the lance is arranged with the channel or trough facing uppermost to facilitate loading the spring unit. Thereafter the lance is moved angularly through 90° so that two rows of interconnected springs in the spring unit are arranged in spaced parallel planes for insertion into the pocket with the lance and between the indexing rails. After insertion of the lance into the pocket, the indexing rails are moved relatively towards each other, in turn to compress the spring unit urging the two rows towards each other. The lance can then be withdrawn from the pocket with the teeth disengaged from the spring unit, and the indexing rails are then moved away from each other to permit movement of the spring assembly through the next intermittent step in order to bring the next successive pocket to the insertion station to receive a respective spring unit.

One embodiment of our invention is illustrated in the accompanying drawings in which:

FIG. 1 is a plan of apparatus for making spring assemblies for use in mattresses or spring upholstered furniture and the like;

Figure 1:
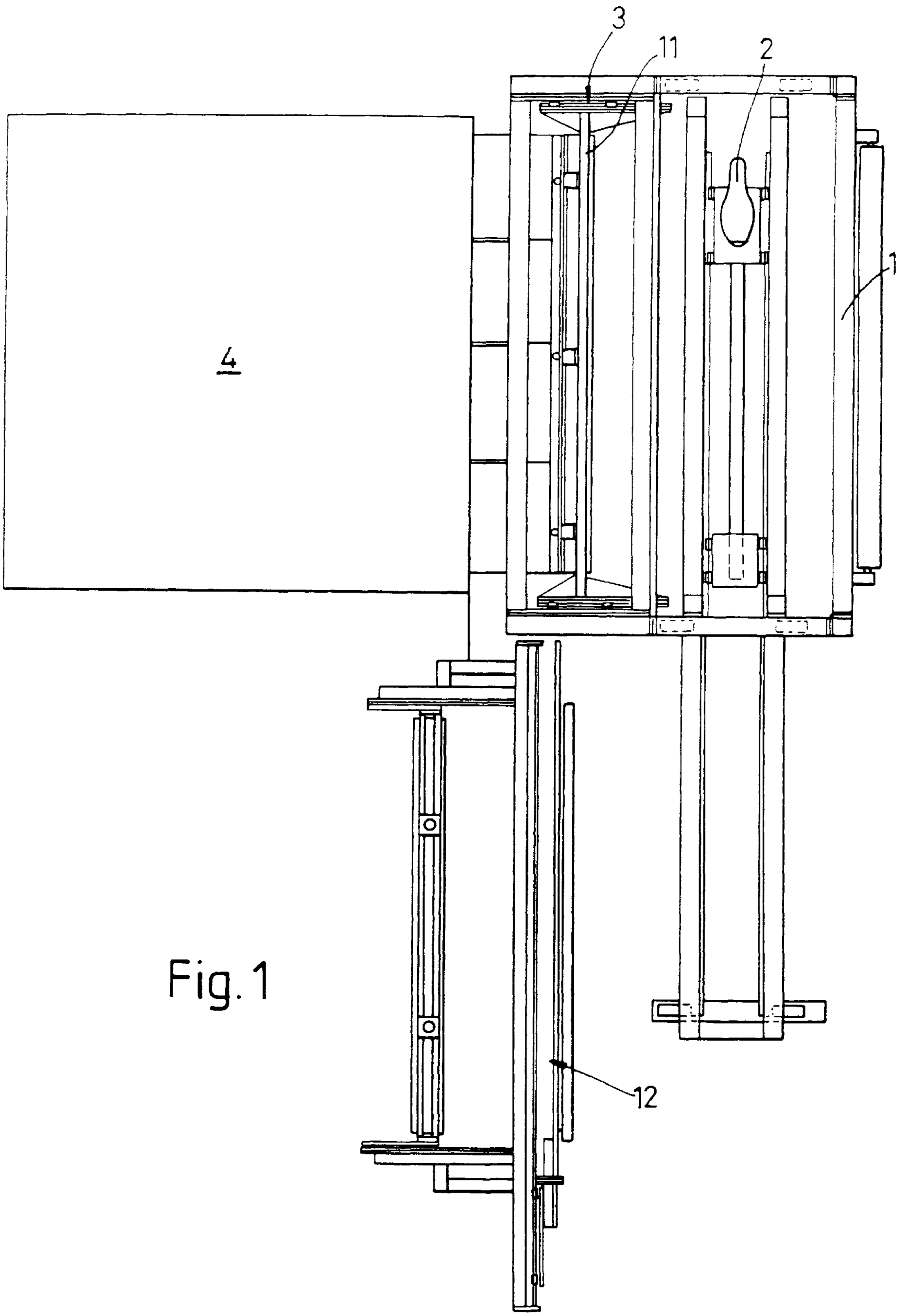
Figure 2:
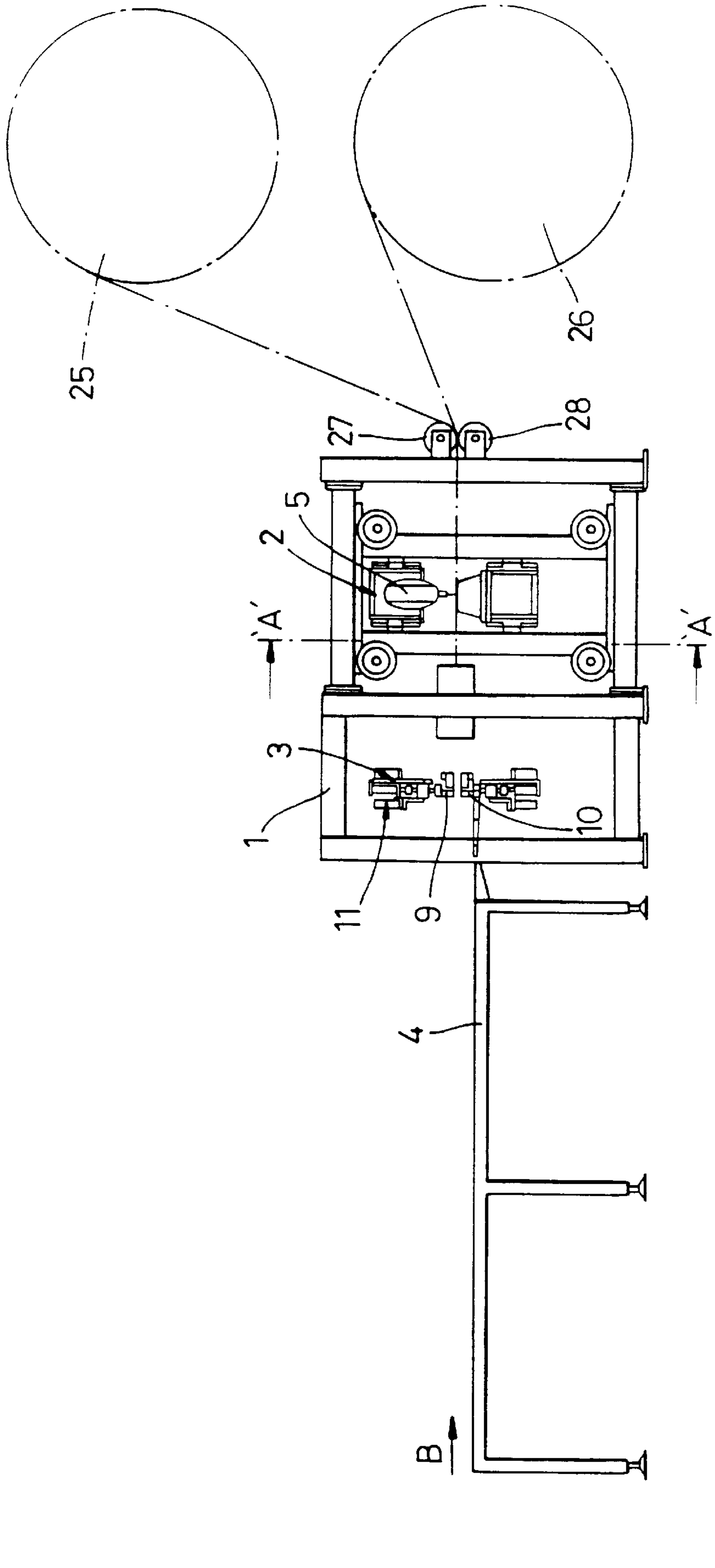
FIG. 2 is a side elevation of the apparatus of FIG. 1.
Figure 3:
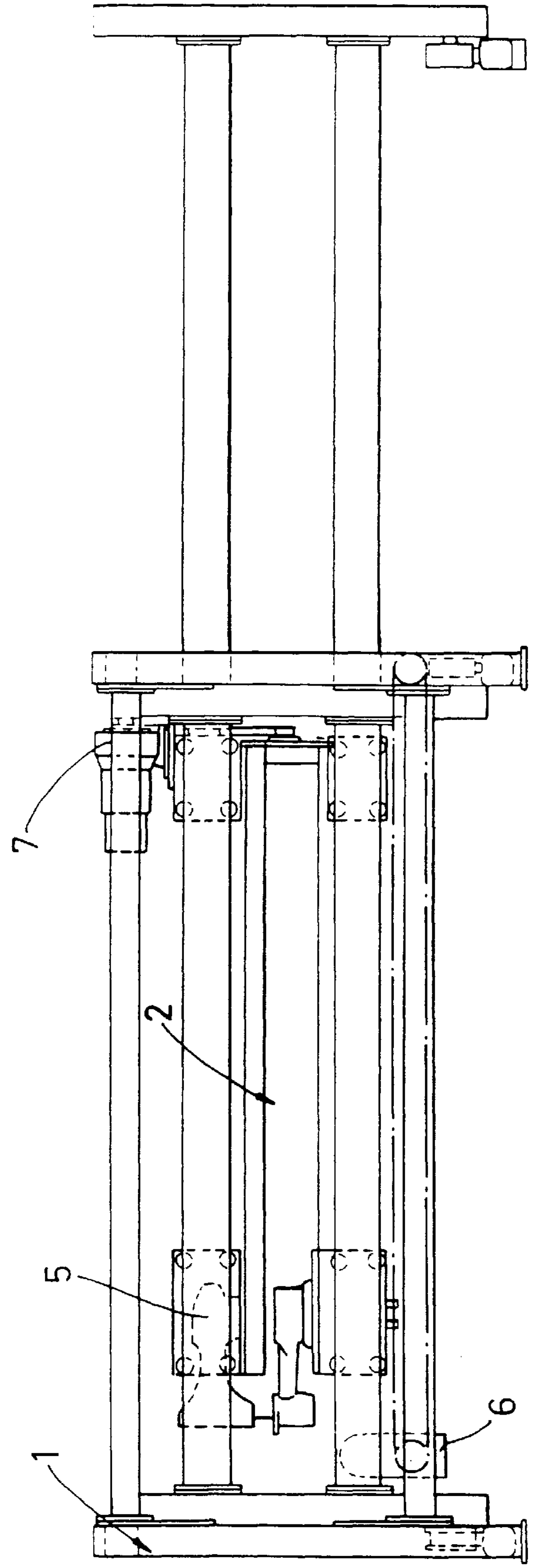
FIG. 3 is a view on the line A—A of FIG. 2.
Figure 4:
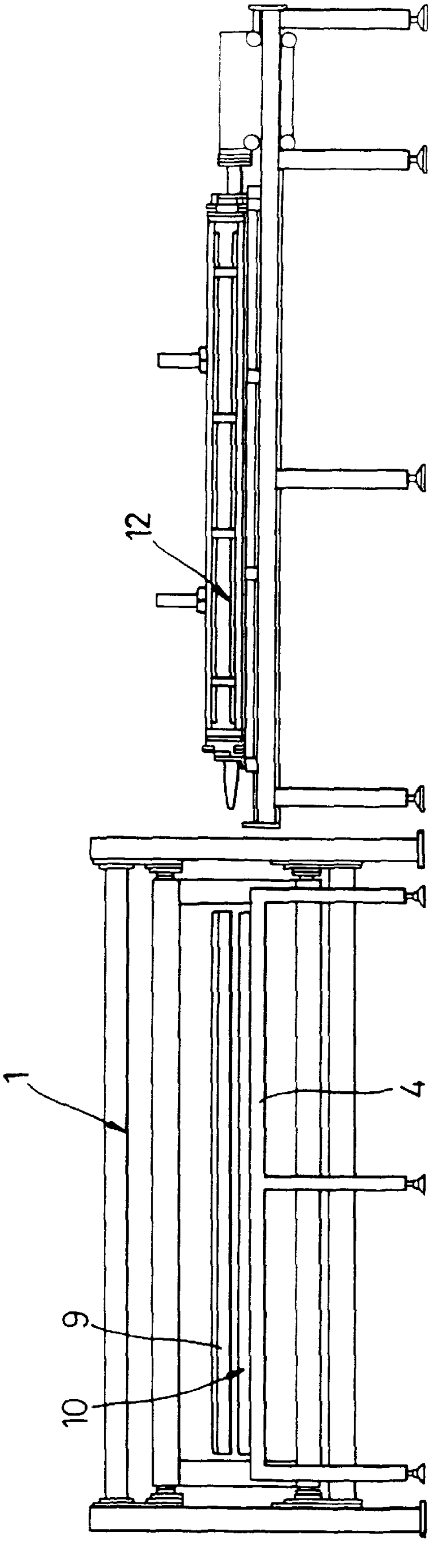
FIG. 4 is an end view of the apparatus in the direction of arrow "B" of FIG. 2.
Figure 5:
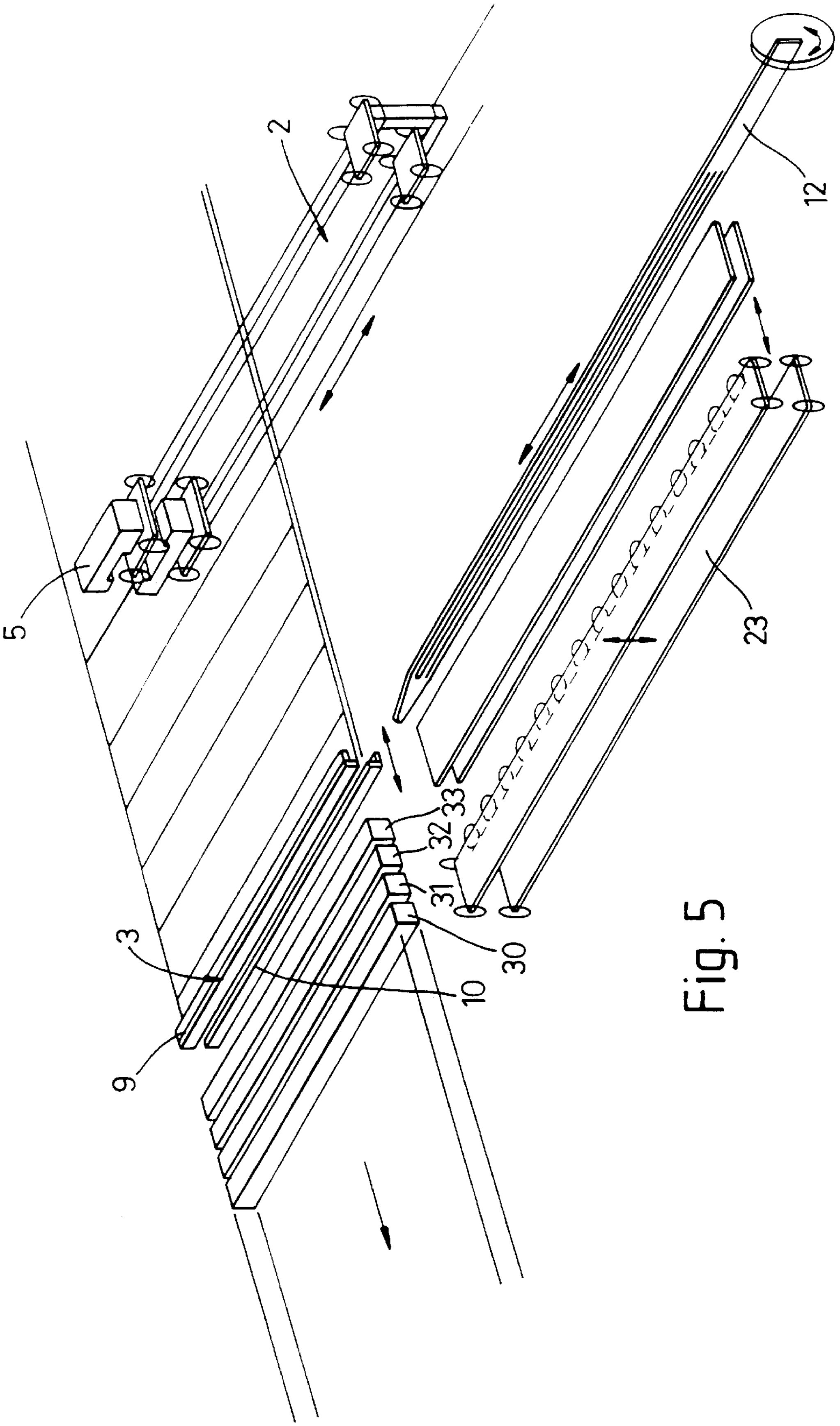
FIG. 5 is a schematic perspective view illustrating the spring insertion device.
Figure 6:
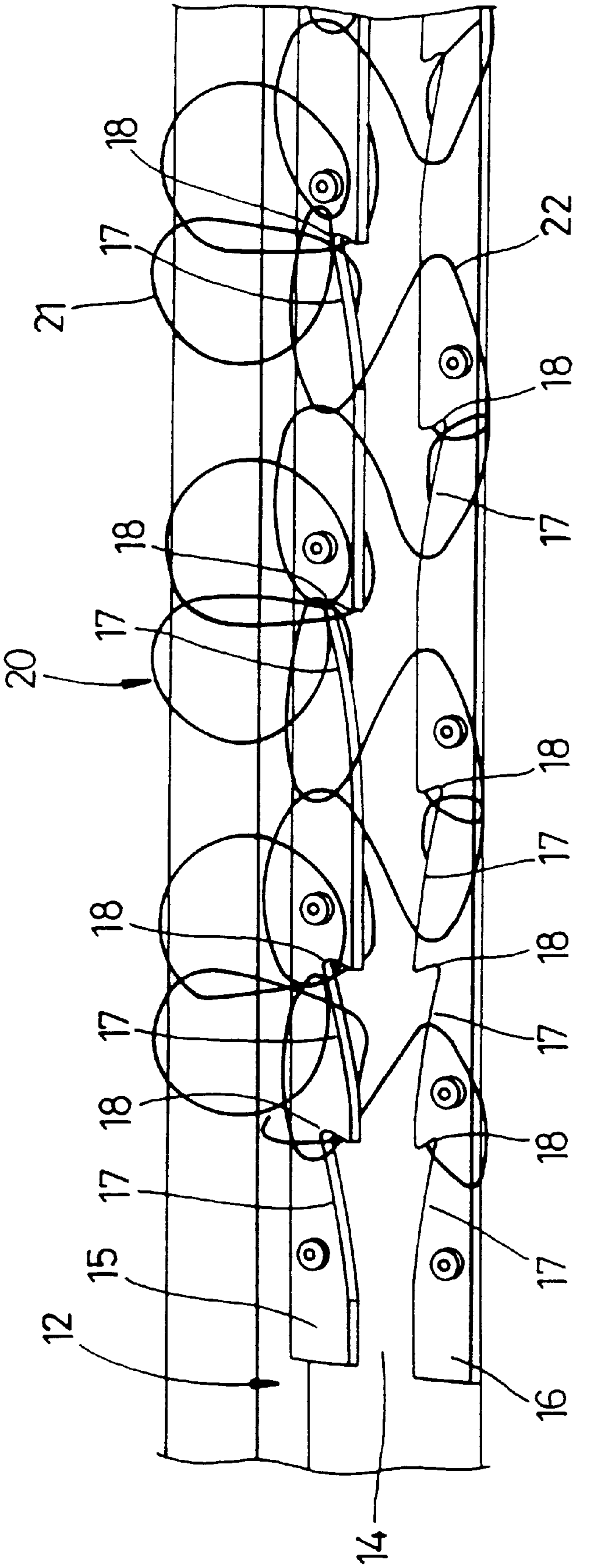
FIG. 6 is a perspective view of a lance forming part of the spring insertion device.

The apparatus illustrated in the accompanying drawings comprises a framework 1 incorporating means defining a securing station 2, a spring insertion station 3 downstream of the securing station 2, and a table 4 for supporting spring assemblies.

A sewing head 5 is located at the securing station 2. The sewing head 5 is guided to traverse the framework 1 under the control of a variable speed geared motor 6 and a variable speed needle position motor 7.

At the spring insertion station 3, a pair of upper and lower indexing rails 9 and 10, each of "L" shaped section comprising a generally horizontal flange, and an end flange which faces the end flange of the other rail, are moveable towards and away from each other in a generally vertical direction under the control of an indexing trolley 11, and in synchronism with a traversing movement across the framework of a spring inserter comprising a lance 12. The lance 12 comprises an elongate member which is pointed at its inner end 13 and which is provided in one face with a spring receiving trough or channel 14 defined between spaced side walls 15, 16 of which the inner faces are of saw-toothed outline of which the flanks 17 of the teeth diverge in a direction away from the pointed end 13.

A coiled spring unit 20 comprising two rows of spring coils 21, 22 which are looped together is adapted to be loaded into the channel by the use of a spring loading device 23. In this position the channel 14 faces upwards. When loaded the loops of the spring unit 20 cooperate with the crests 18 of the teeth.

A spring assembly is manufactured by drawing continuous superimposed webs of strong yet flexible material into the apparatus from upper and lower rolls 25, 26 and through the securing station 2, by the use of guide rollers 27, 28. At the securing station 2 the sewing head 5 is adapted to traverse the superimposed webs to join them together at spaced intervals in accordance with intermittent step wise forward movement of the webs through the apparatus to form a plurality of similar spring-receiving open-ended transverse pockets 30, 31, 32, 33 . . . arranged side-by-side in a spaced parallel relationship. The webs defining the pockets are supported upon the table 4.

As each pocket arrives at the spring insertion station 3, it is disposed between the indexing rails 9 and 10 located in a spaced position.

When the pocket is stationary at the insertion station 3, the lance 12 is rotated through 90° so that the coils of the spring unit are arranged in two rows above and below each other. The lance 12 is then inserted into a pocket, say the pocket 30, between the indexing rails 9 and 10 with the loops of the spring unit 20 engaging with crests 18 of the teeth to carry the spring unit with the lance into the pocket 30. At the extent of the forward movement of the lance 12 the indexing rails 9 and 10 are moved towards each other in order to apply a compressive force to the spring unit through the webs. This urges the two rows 21, 22 of spring coils towards each other thereby causing the spring unit to be displaced from the channel, suitably freed from the teeth. The lance 12 can then be withdrawn from the pocket 30, and, after withdrawal, is finally rotated through 90° in the opposite direction to receive a further spring unit.

The indexing rails 9 and 10 are then returned to their original, spaced position, leaving the spring unit retained within the pocket 30. The spring assembly is then advanced through one further step, when the sequence described above is repeated for the insertion of spring units into the pocket 31 and into adjacent pockets, in turn, as they come into alignment with the insertion station.

In a modification of the apparatus described above, the lower indexing rail 10 is fixed against movement with respect to the upper rail 9. The upper rail 9 is therefore movable in a vertical plane with respect to the lower rail 10 to urge the two rows 21, 22 of spring coils towards each other to disengage the unit 20 from the channel 14 and permit the lance 12 to be withdrawn from the pocket as described above.

A spring assembly manufactured as described above can be cut to any convenient length, and may be used on its own or superimposed upon one or more similar assemblies to form a spring interior for a mattress or for use in other articles of upholstered furniture.

What is claimed is:

1. Apparatus for use in making spring assemblies for use in mattresses, spring upholstered furniture comprising upper and lower continuous webs of strong yet flexible material, a securing station, an insertion station downstream of said securing station, means for drawing said webs into a superimposed relationship at said securing station, securing means adapted to traverse the webs at said securing station to secure them together at spaced parallel locations, in turn to form a succession of spaced parallel pockets which traverse said webs, and an insertion device for inserting a spring unit into each successive pocket at said insertion station, wherein said insertion device comprises an elongate channel or trough shaped member for inserting a spring unit into a pocket, in combination with upper and lower indexing rails which are relatively movable towards and away from each other to release an inserted spring unit from said member whereafter said member can be withdrawn from said pocket leaving said spring unit in position, wherein said elongate member comprise a lance having a face in which is provided a channel or trough and wherein internal side walls defining said channel or trough are formed with projections of saw-tooth outline to receive parts of said spring unit, flanks of said teeth diverging with respect to the direction of insertion of said lance into a pocket, and crests of said teeth cooperating with said spring unit to ensure that said spring unit is carried into said pocket with said lance.

2. Apparatus for use in making spring assemblies for use in mattresses, spring upholstered furniture comprising upper and lower continuous webs of strong yet flexible material, a securing station, an insertion station downstream of said securing station, means for drawing said webs into a superimposed relationship at said securing station, securing means adapted to traverse the webs as said securing station to secure them together at spaced parallel locations, in turn to form a succession of spaced parallel pockets which traverse said webs, and an insertion device for inserting a spring unit into each successive pocket at said insertion station, wherein said insertion device comprises an elongate channel or trough shaped member for inserting a spring unit into a pocket, in combination with upper and lower indexing rails which are relatively movable towards and away from each other to release an inserted spring unit from said member whereafter said member can be withdrawn from said pocket leaving said spring unit in position, wherein said elongate member comprises a lance having a face in which is provided a channel or trough, and wherein internal side walls defining said channel or trough are formed in projections of saw-tooth outline to receive parts of said spring unit, flanks of said teeth diverging with respect to the direction of insertion of said lance into a pocket, and crests of said teeth cooperating with said spring unit to ensure that said spring unit is carried into said pocket with said lance, and wherein said lance is movable angularly through 90° between a loading position and an insertion position, wherein in said loading position said lance is disposed with said channel or trough facing uppermost to facilitate loading a spring unit into said lance and in said insertion position said upper and lower rows of interconnected springs comprising said unit are arranged in two rows superimposed above and below each other for insertion into a respective pocket with said lance.

3. Apparatus according to claim 2 wherein in said insertion position said lance is movable in a transverse direction to insert said unit into said pocket, whereafter said indexing rails are movable relatively towards each other, in turn to compress said spring unit by urging said upper and lower rails towards each other, and enabling said lance to be withdrawn to said initial insertion position, subsequent relative movement of said indexing rails away from each other leaving said spring retained within said pocket.

* * * * *